(12) United States Patent
Shinza et al.

(10) Patent No.: US 11,536,636 B2
(45) Date of Patent: Dec. 27, 2022

(54) HARDNESS TESTER AND PROGRAM

(71) Applicant: MITUTOYO CORPORATION, Kanagawa (JP)

(72) Inventors: Koji Shinza, Kanagawa (JP); Fumihiko Koshimizu, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 273 days.

(21) Appl. No.: 16/950,076

(22) Filed: Nov. 17, 2020

(65) Prior Publication Data
US 2021/0156777 A1    May 27, 2021

(30) Foreign Application Priority Data
Nov. 21, 2019  (JP) .............................. JP2019-210086

(51) Int. Cl.
| G01N 3/16 | (2006.01) |
| G01N 3/02 | (2006.01) |
| G06T 7/00 | (2017.01) |
| G01N 3/42 | (2006.01) |
| G06V 20/20 | (2022.01) |

(52) U.S. Cl.
CPC .............. *G01N 3/165* (2013.01); *G01N 3/02* (2013.01); *G06T 7/0004* (2013.01); *G01N 3/42* (2013.01); *G01N 2203/008* (2013.01); *G01N 2203/0019* (2013.01); *G01N 2203/0037* (2013.01); *G01N 2203/0078* (2013.01); *G01N 2203/0252* (2013.01); *G06T 7/0008* (2013.01); *G06T 2207/10056* (2013.01); *G06T 2207/30136* (2013.01); *G06V 20/20* (2022.01)

(58) Field of Classification Search
CPC ... G01N 2203/0252; G01N 2203/0037; G01N 2203/0078; G01N 2203/0019; G01N 2203/008; G01N 3/165; G01N 3/02; G01N 3/42; G06T 2207/30136; G06T 2207/10056; G06T 7/0004; G06T 7/0008; G06V 20/20
See application file for complete search history.

(56) References Cited

U.S. PATENT DOCUMENTS

| 8,578,284 | B2 | 11/2013 | Takemura et al. | |
| 8,887,558 | B2 * | 11/2014 | Kawazoe | ............... G01N 3/068 |
| | | | | 850/1 |
| 9,063,048 | B2 | 6/2015 | Koshimizu | |
| 9,417,171 | B2 | 8/2016 | Takemura et al. | |
| 9,442,054 | B2 | 9/2016 | Takemura et al. | |
| 9,442,056 | B2 | 9/2016 | Koshimizu et al. | |
| 10,024,774 | B2 | 7/2018 | Koshimizu et al. | |

(Continued)

FOREIGN PATENT DOCUMENTS

JP    2012-78307 A    4/2012

*Primary Examiner* — Jonathan M Dunlap
(74) *Attorney, Agent, or Firm* — Greenblum & Bernstein, P.L.C.

(57) ABSTRACT

A hardness tester includes an image acquirer (controller) acquiring an image of a surface (surface image) of a sample captured by an image capturer, an identifier (controller) identifying, based on the surface image of the sample, a non-conformity region inside the image that is unsuitable for the hardness test using predetermined conditions, and a test position definer (controller) defining a test position in an area outside the non-conformity region identified by the identifier.

14 Claims, 6 Drawing Sheets

(56) References Cited

U.S. PATENT DOCUMENTS

| | | |
|---|---|---|
| 10,094,753 B2 | 10/2018 | Sawa et al. |
| 10,663,381 B2 | 5/2020 | Koshimizu et al. |
| 2004/0096093 A1* | 5/2004 | Hauck ..................... G01N 3/42 |
| | | 382/141 |
| 2017/0074764 A1* | 3/2017 | Furuta ..................... G01N 3/42 |
| 2017/0122856 A1 | 5/2017 | Koshimizu |

* cited by examiner

HARDNESS TESTER AND PROGRAM

CROSS-REFERENCE TO RELATED APPLICATIONS

The present application claims priority under 35 U.S.C. § 119 of Japanese Application No. 2019-210086, filed on Nov. 21, 2019, the disclosure of which is expressly incorporated by reference herein in its entirety.

BACKGROUND OF THE INVENTION

1. Field of the Invention

The present invention relates to a hardness tester and a program.

2. Description of Related Art

Conventionally, a hardness tester is known which measures hardness of a sample based on dimensions of an indentation formed by pressing an indenter against the sample (work piece) with a predetermined test force. As an example of the hardness tester, a hardness tester is proposed in which, when a sample that has been tested once is retested, the hardness tester is capable of avoiding a position where an indentation was previously formed and of automatically defining a position suitable for a retest (see, for example, Japanese Patent Laid-open Publication No. 2012-078307).

However, in the hardness tester disclosed in Japanese Patent Laid-open Publication No. 2012-078307 noted above, in the first test, a user needs to visually check and define the test position so that the test position dose not overlap with a position where there is foreign matter. When the position of the foreign matter and the test position overlap, the user must carry out an operation to reset the test position which requires additional work.

SUMMARY OF THE INVENTION

The present disclosure has been devised in consideration of the circumstances above and provides a hardness tester and a program that are capable of simplifying defining a test position.

One aspect of the present disclosure is conceived to achieve the above-noted purpose, and provides a hardness tester which measures hardness of a sample by loading a predetermined test force on a surface of the sample with an indenter to form an indentation in the surface of the sample and measuring dimensions of the indentation. The hardness tester includes an image acquirer acquiring an image of the surface of the sample captured by an image capturer, an identifier identifying, based on the image of the surface of the sample, a non-conformity region inside the image that is not suitable for the hardness test using predetermined conditions, and a test position definer defining a test position in an area outside the non-conformity region identified by the identifier.

Another aspect of the present disclosure is the hardness tester which includes a specifier specifying one or a plurality of test positions for the sample based on the image of the surface of the sample acquired by the image acquirer, and in which the test position definer defines the test position specified by the specifier and, when the test position is inside the non-conformity region, corrects the test position to a position not inside the non-conformity region.

Another aspect of the present disclosure is the hardness tester in which the specifier, when a test pattern related to an arrangement of the test positions is specified based on a user operation, specifies the plurality of test positions based on the test pattern, and the test position definer corrects, of the various test positions specified by the specifier, a test position that is inside the non-conformity region to a position not inside the non-conformity region.

Another aspect of the present disclosure is the hardness tester in which the test position definer, when correcting the test position that is inside the non-conformity region to the position not inside the non-conformity region, uses a predetermined point, line, or plane on the sample as a reference and corrects the test position to a position that is a similar distance from the reference as the distance from the reference to the original test position.

Another aspect of the present disclosure is the hardness tester in which the specifier, when the test pattern related to the arrangement of the test positions is specified based on the user operation, specifies the plurality of test positions based on the test pattern, and the test position definer, when at least any one of the various test positions specified by the specifier is inside the non-conformity region, corrects each of the test positions to a position that is not inside the non-conformity region and that can also maintain the test pattern.

Another aspect of the present disclosure is the hardness tester which includes a binarization component that binarizes, based on a predetermined threshold value, the image of the surface of the sample acquired by the image acquirer, and the identifier identifies, based on image data binarized by the binarization component, an area that is equal to or less than the predetermined threshold value as the non-conformity region.

Another aspect of the present disclosure is a program that causes a computer of the hardness tester, which measures hardness of the sample by loading the predetermined test force on the surface of the sample with the indenter to form the indentation in the surface of the sample and measuring dimensions of the indentation, to serve as the image acquirer acquiring the image of the surface of the sample captured by the image capturer, the identifier identifying, based on the image of the surface of the sample, the non-conformity region inside the image that is not suitable for the hardness test using predetermined conditions, and the test position definer defining the test position in the area outside the non-conformity region identified by the identifier.

The present disclosure can simplify defining the test position.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE DISCLOSURE

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present disclosure is described with reference to the drawings.

Figure 1:
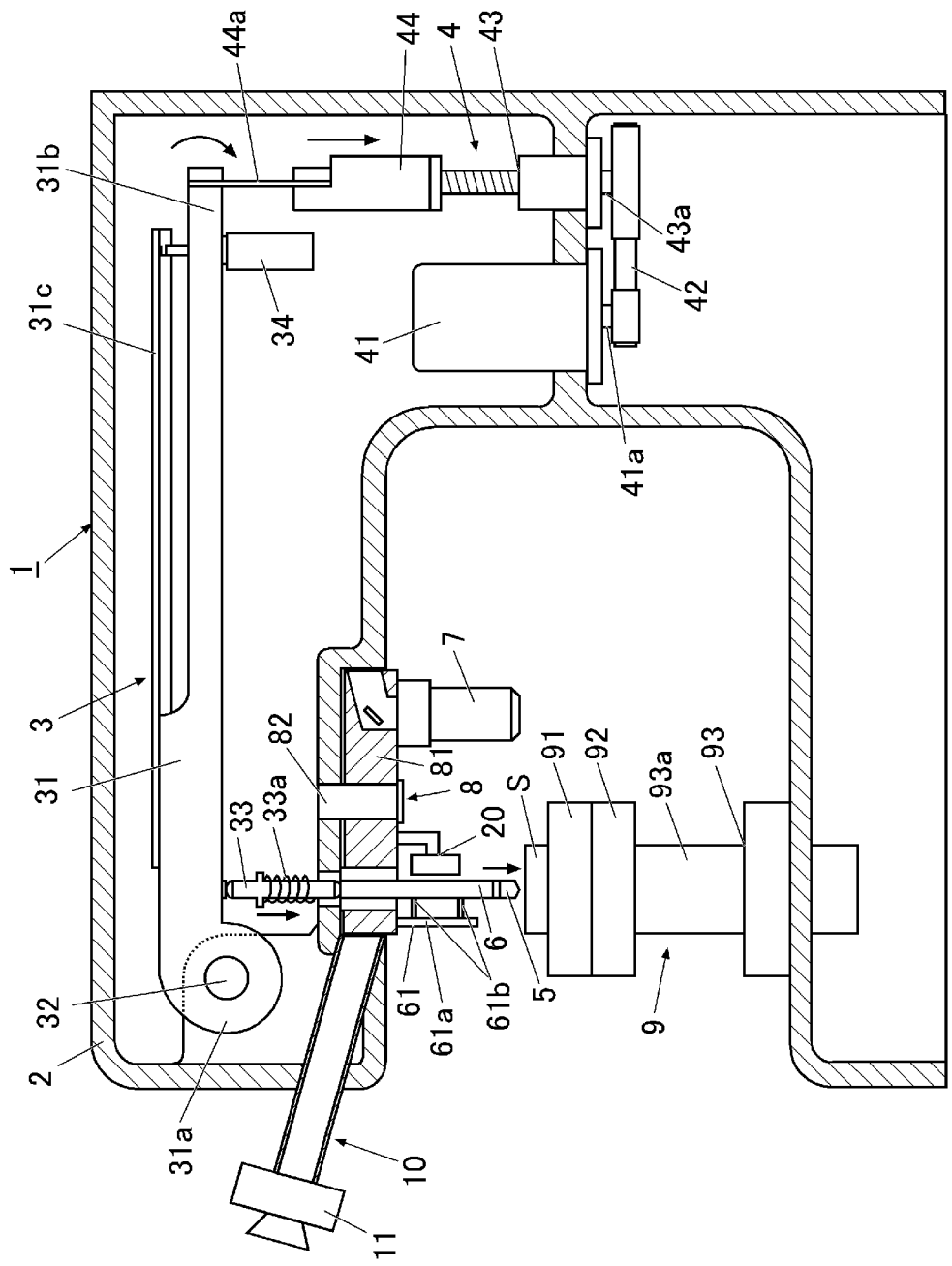
FIG. 1 is a side view illustrating an overall configuration of a hardness tester according to the present disclosure.
Figure 2:
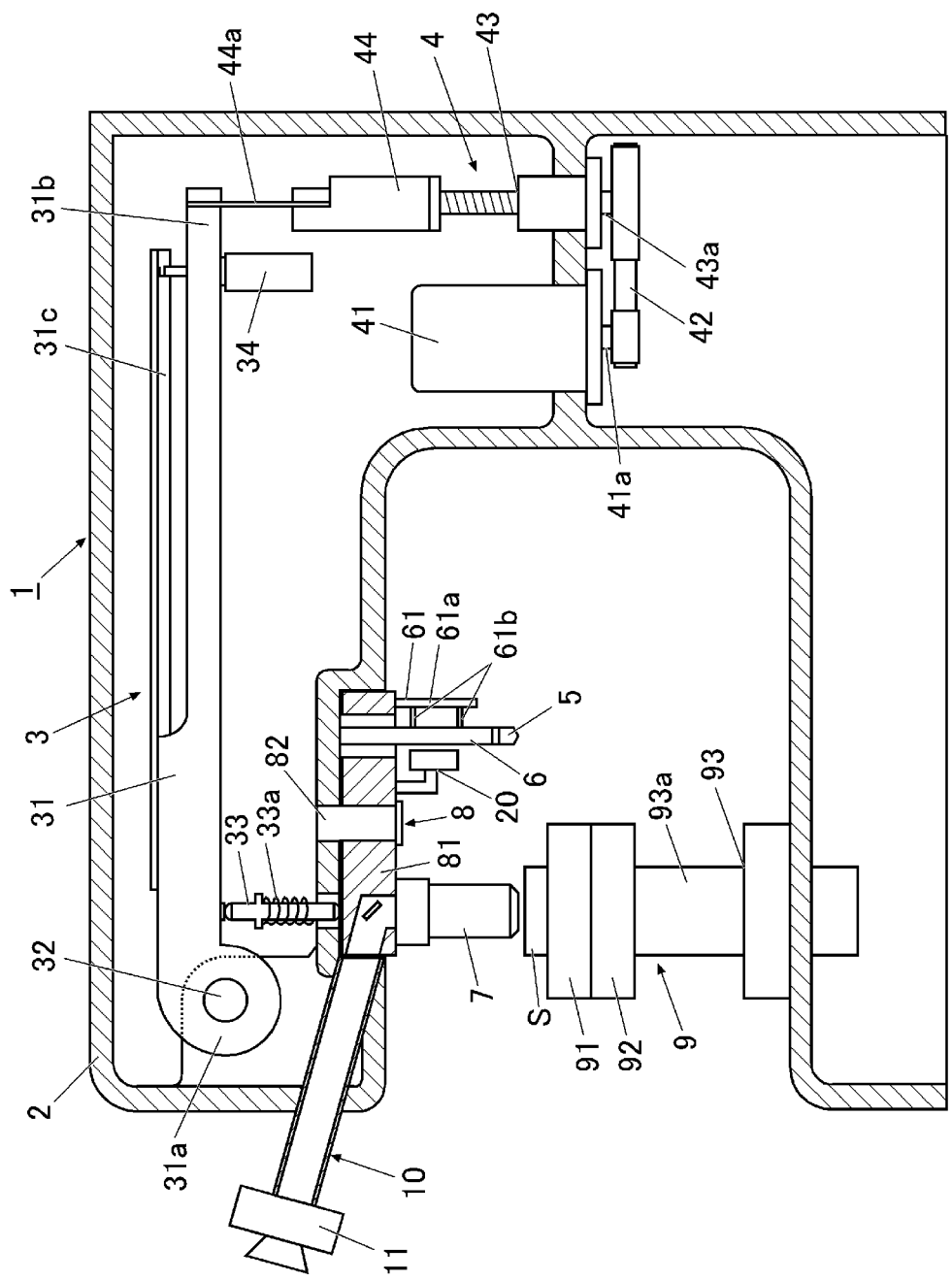
FIG. 2 is a side view illustrating an overall configuration of the hardness tester according to the present disclosure.
Figure 3:
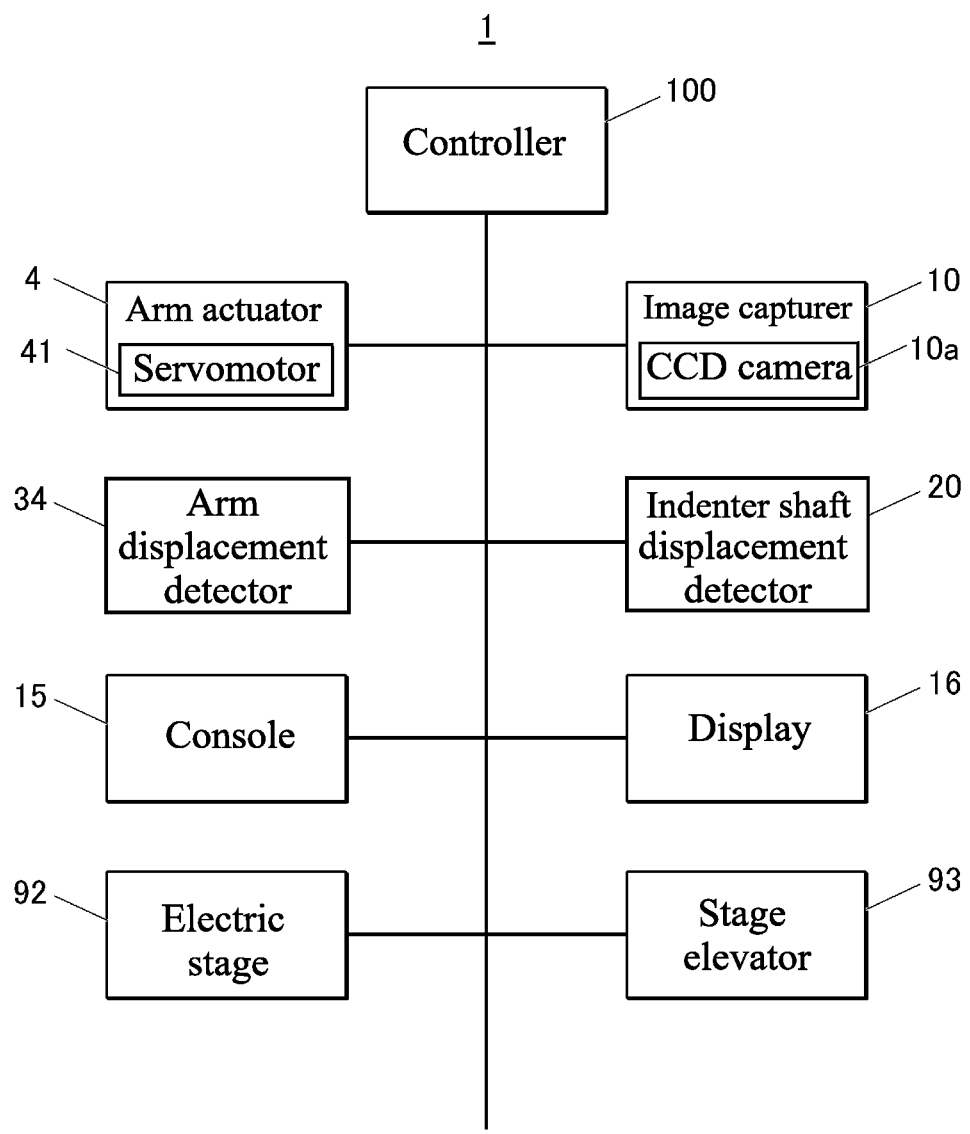
FIG. 3 is a block diagram illustrating a control structure of the hardness tester according to the present disclosure.

1. Description of Configuration As shown in FIGS. 1 to 3, a hardness tester 1 according to the present embodiment is configured to include a tester main body 2 in which each component is arranged, a load arm 3 rotatably supported by the tester main body 2, an arm actuator 4 that gives acting force (test force) to the load arm 3 and actuates the load arm 3, a turret 8 rotatably provided to the tester main body 2 below the load arm 3, an indenter shaft 6 attached to the turret 8 and provided with an indenter 5 on a tip of the indenter shaft 6, an objective lens 7 attached to the turret 8, a sample stand 9 that is positioned opposite the turret 8 and on which a sample S is placed, an image capturer 10 that captures an image of an indentation formed on the sample S placed on the sample stand 9, a console 15 for inputting the test force and estimated hardness of the sample S, a display 16 that displays an image of the surface of the sample S and the indentation formed in the surface of the sample S, and a controller 100. In the hardness tester 1, the controller 100 performs operation control of each component.

The load arm 3 is configured to include an arm main body 31 and a rotation axis 32 that pivotally supports a first end portion 31a of the arm main body 31 on the tester main body 2. A second end side of the arm main body 31 is split into a first other end 31b and a second other end 31c. The first other end 31b is formed in a plate spring shape having flexibility. On the bottom surface side of the arm main body 31, a load axis 33 elastically supported by a coil spring 33a is provided between the bottom surface of the arm main body 31 and the tester main body 2. In addition, the arm main body 31 is provided with an arm displacement detector 34 that detects an opening amount between the first other end 31b and the second other end 31c when the load arm 3 (arm main body 31) is actuated.

In the arm main body 31, the first end portion 31a is pivotally supported on the tester main body 2 by the rotation axis 32 so as to freely rotate and the first other end 31b is connected to the arm actuator 4 that generates the acting force (test force) that actuates the load arm 3. Then, accompanying movement of the arm actuator 4, the arm main body 31 rotates centered on the rotation axis 32. Accompanying this downward rotation of the arm main body 31, the arm main body 31 presses the load axis 33 downward and displaces the load axis 33. The load axis 33 transmits to the indenter shaft 6 the drive and movement of the arm main body 31 (load arm 3) (see FIG. 1).

The arm displacement detector 34 is configured to include a scale with scale marks at a predetermined distance, and a linear encoder that optically reads the scale marks of the scale. The arm displacement detector 34 detects an opening amount (displacement amount of the spring) between the first other end 31b and the second other end 31c when the indenter 5 is pressed into the sample S via the indenter shaft 6 and the like, and outputs to the controller 100 an arm displacement signal based on the detected opening amount. Further, the opening amount corresponds to a pressing force (test force) of the indenter 5 pressing into the sample S or to a load applied to the sample S.

The arm actuator 4 is configured to include a servomotor 41, a ball screw 43, a timing belt 42 that spans between a motor axis 41a of the servomotor 41 and a screw axis 43a of the ball screw 43, and a fixing jig 44 held by the ball screw 43. Further, the arm actuator 4 is connected to the load arm 3 by fixating a plate spring 44a of the fixing jig 44 to the first other end 31b of the arm main body 31.

The servomotor 41 is driven based on a drive control signal input by the controller 100. The motor axis 41a of the servomotor 41 is rotated by the drive of the servomotor 41. The drive force of the motor axis 41a is transmitted to the screw axis 43a of the ball screw 43 via the timing belt 42 and rotates the ball screw 43. The fixing jig 44 is moved up and down by the rotary drive of the ball screw 43. In this way, the arm actuator 4 moves the fixing jig 44 up and down based on the drive of the servomotor 41 and transmits the drive (drive force) to the first other end 31b of the arm main body 31 that is connected to the fixing jig 44 to rotate the arm main body 31 (load arm 3). Further, the plate spring 44a is designed to bend when the arm actuator 4 moves the load arm 3.

The sample stand 9 is configured to include a sample stage 91 on which the sample S is placed, an motorized stage 92 which is arranged on a bottom surface of the sample stage 91, and a lift stage 93 provided to a bottom surface of the motorized stage 92. The motorized stage 92 is driven by a drive mechanism (not shown in the drawings) driven in response to the control signal output by the controller 100, and can be moved in a direction perpendicular to the indenter shaft 6 (horizontal direction). The lift stage 93 includes a screw portion 93a and can move the sample stage 91 up and down with respect to the tester main body 2 by rotating the screw portion 93a.

The turret 8 is configured to include a turret main body 81 and a rotation axis 82 that pivotally supports the turret main body 81 on the tester main body 2 so as to freely rotate. The indenter shaft 6, the objective lens 7, and an indenter shaft displacement detector 20 that detects a displacement amount of the indenter shaft 6 are provided to the turret main body 81. The indenter shaft 6 is provided to the turret main body 81 via an indenter shaft holder 61. The turret main body 81 can switch the placement of the indenter shaft 6 and the objective lens 7 by rotating centered on the rotation axis 82.

The indenter shaft holder 61 is configured to include a vertical holding member 61a and plate springs 61b extending from the vertical holding member 61a in a lateral direction. The indenter shaft 6 is elastically supported by the plate springs 61b of the indenter shaft holder 61 and is provided perpendicularly to a surface of the sample stage 91 on which the sample S is placed, specifically to a surface (upper surface) of the sample placed on the sample stage 91. The indenter 5 is provided to a bottom end of the indenter shaft 6 so as to be replaceable. For example, when a Vickers hardness test is performed, a quadrangular pyramidal Vickers indenter (with opposing face angles of 136±0.5°) is used as the indenter 5. In the present embodiment, a quadrangular pyramidal Vickers indenter is used as the indenter 5. As shown in FIG. 1, the hardness tester 1 rotates the turret 8 (turret main body 81) and switches the indenter shaft 6 to a position corresponding to the load axis 33, and can thereby transmit to the indenter shaft 6 the acting force of the movement of the load axis 33 moving downward accompanying the rotation of the load arm 3. Accordingly, the hardness tester 1 can press the indenter 5 against and into the sample S.

The objective lens 7 is a lens portion associated with a microscope 11 of the image capturer 10. As shown in FIG. 2, the hardness tester 1 rotates the turret 8 (turret main body 81) and switches the objective lens 7 to a position corresponding to the image capturer 10, and thereby allows the image capturer 10 to capture the image of the sample S.

The indenter shaft displacement detector 20 is configured to include a scale with scale marks at a predetermined distance, and a linear encoder that optically reads the scale marks. The indenter shaft displacement detector 20 detects a displacement amount by which the indenter shaft 6 moves when forming an indentation on the sample S (in other words, an amount of intrusion and a depth of indentation to which the indenter 5 is pressed into the sample S) and outputs to the controller 100 an indentation axis displacement signal based on the detected displacement amount.

The image capturer 10 is configured to include the microscope 11, a CCD camera 10a attached to the microscope 11, and an illumination device (not shown in the drawings) for illuminating an observation position of the sample S, and captures an image of the indentation formed on the surface of the sample S. Then, the image capturer 10 (CCD camera 10a) outputs to the controller 100 an image of the captured indentation.

The console 15 includes a pointing device such as a mouse and a keyboard, and receives an input operation from a worker (operator) when performing the hardness test. For example, the console 15 receives an input operation of the test force and an estimated hardness of the sample S estimated by the worker. Then, once the predetermined input operation from the worker is received, the console 15 generates a predetermined operation signal according to the input operation and outputs the operation signal to the controller 100.

The display 16 is configured by a display device such as a liquid crystal display (LCD). The display 16 displays, for example, setting conditions of the hardness test that were input on the console 15, results of the hardness test, and images of the surface of the sample S and the indentation formed in the surface of the sample S that are captured by the CCD camera 10a.

As shown in FIG. 3, the controller (image acquirer, identifier, test position definer, specifier, and binarization component) 100 is configured to include a CPU, a RAM, a ROM, and the like, and executes a predetermined program stored in the ROM, and thereby has a function to perform operation control to carry out the predetermined hardness test, for example. In addition to the predetermined program, for example, the ROM stores a plurality of types of test patterns related to arrangements of test positions used when performing a multipoint measurement process that is described later.

For example, the controller 100 compares the arm displacement signal input by the arm displacement detector 34 with arm displacement data that is defined in advance. Since the controller 100 rotates the load arm 3 so as to cause the indenter 5 to act on the sample S with the predetermined test force (load), the controller 100 outputs to the servomotor 41 the drive control signal controlling the drive of the arm actuator 4 (servomotor 41).

In addition, the controller 100 controls the motorized stage 92 and moves the sample stand 9 (sample stage 91) in the horizontal direction, thereby achieving a positioning function for the test that determines the position at which to form the indentation on the sample S.

Further, the controller 100 controls the lift stage 93 to move the sample stand 9 (sample stage 91) in the vertical direction and change a relative distance between the sample stage 91 and the objective lens 7, thereby achieving an automatic focusing function for focusing on the surface of the sample S placed on the sample stage 91.

Further, the controller 100 analyzes the image of the indentation input by the image capturer 10 by performing predetermined image processing, for example, and automatically measures the size (dimensions) of the indentation, and detects the distance between predetermined feature points. In addition, the controller 100 calculates the hardness of the sample S based on the distance between the predetermined feature points of the detected indentation. In other words, the controller 100 calculates the hardness of the sample S based on a Vickers hardness test, for example, that measures the hardness of the sample S from the size of the indentation (distance between the predetermined feature points) formed on the sample S by pressing the indenter 5 into the sample S.

2. Description of Operation

Next, a process of multipoint measurement performed by the hardness tester 1 according to the present embodiment is described with reference to a flow chart in FIG. 4.

Figure 4:
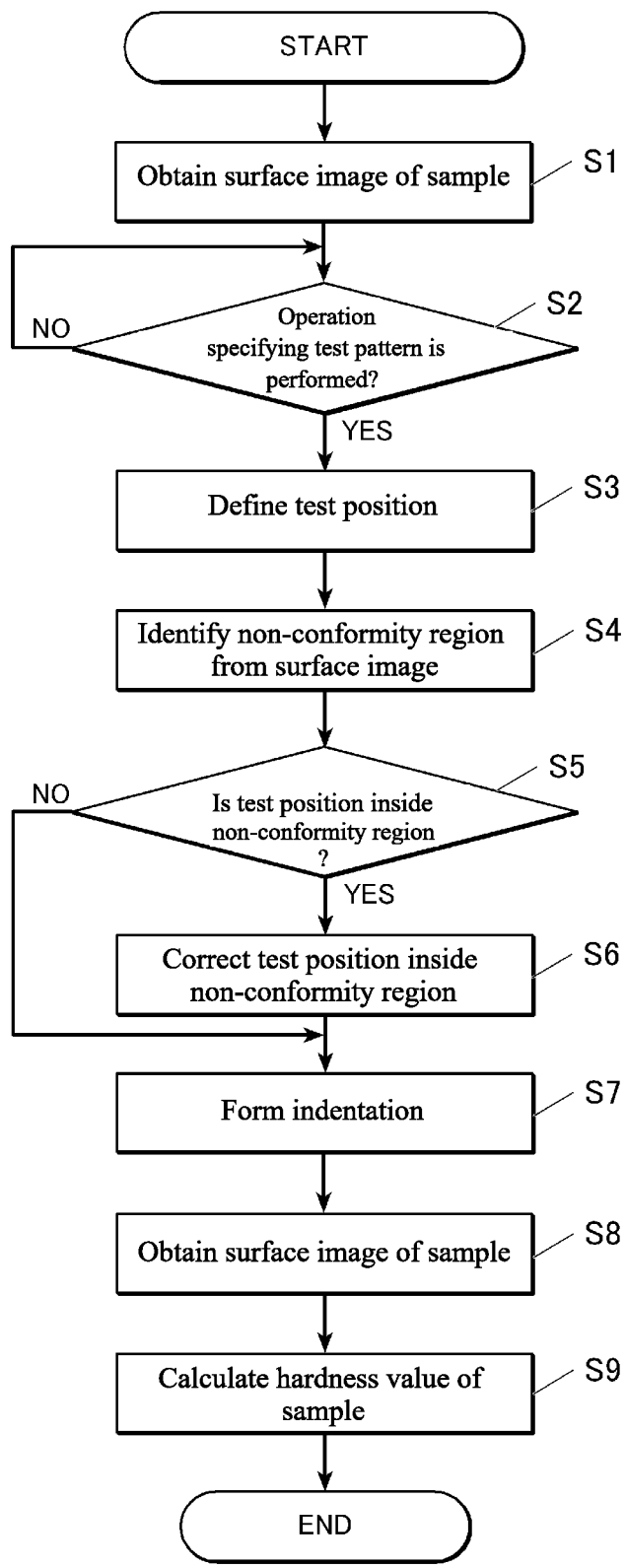
FIG. 4 is a flow chart illustrating operations of the hardness tester according to the present disclosure.

As shown in FIG. 4, first, the controller 100 obtains the surface image of the sample S captured by the CCD camera 10a (step S1).

Next, the controller 100 determines, via the console 15, whether an operation to specify a test pattern desired by a user is performed (step S2).

In step S2, when the controller 100 determines that the operation to specify the test pattern desired by the user is not performed (step S2: NO), the controller 100 repeats the determination process of step S2 until the operation to specify the test pattern desired by the user is performed. However, when the controller 100 determines in step S2 that the operation to specify the test pattern desired by the user is performed (step S2: YES), the controller 100 defines a test position based on the specified test pattern (step S3).

Figure 5A:
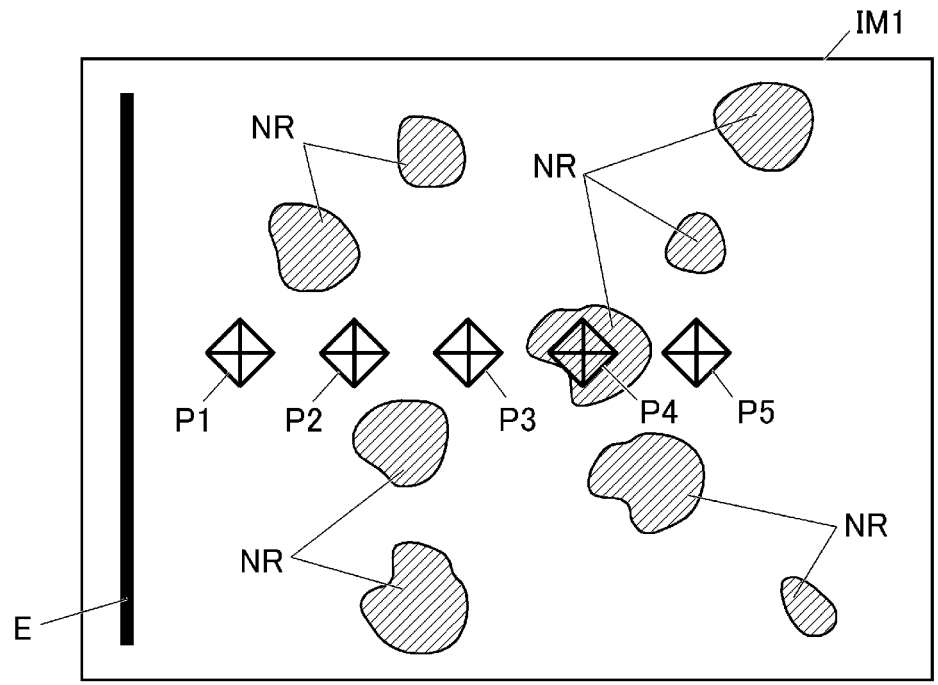
FIG. 5A illustrates a state where each test position is superimposed on the surface image of the sample and displayed according to initial settings.

For example, as shown in FIG. 5A, in a surface image IM1 of the sample S, when a test pattern using a point separated by a predetermined distance from an end face E of the sample S as a start point and performing measurements at five points, beginning at the start point, at a predetermined pitch in a direction orthogonal to the end face E (right direction in the drawing) is specified as the test pattern, the controller 100 defines the five points (test positions P1, P2, ... P5 respectively) based on the test pattern.

Next, the controller 100 identifies, based on the surface image of the sample S that is obtained in step S1, a non-conformity region NR (for example, an area containing foreign matter such as graphite) that is unsuitable for the hardness test (step S4). Specifically, the controller 100 binarizes the surface image of the sample S obtained in step S1 based on a predetermined threshold value. Then, the controller 100 identifies an area that is equal to or less than the predetermined threshold value noted above as the non-conformity region NR (see FIGS. 5A and 5B) based on the binarized image data.

Next, the controller 100 determines whether there is a test position inside the non-conformity region NR identified in step S4, making a determination for each of the test positions defined in step S3 (step S5).

In step S5, when a test position is determined to be inside the non-conformity region NR (step S5: YES), the controller 100 corrects the test position that is inside the non-conformity region NR (step S6). As shown in FIG. 5A, when the test position P4 is inside the non-conformity region NR, the controller 100 corrects the test position to a position that is not inside (i.e., outside) the non-conformity region NR and is a similar distance from the end face E of the sample S as the distance from the end face E to the test position P4 (such as a test position P6 (see FIG. 5B)). In other words, the test position is corrected (to test position P6 as an example) to a distance from the end face E that is substantially the same as the distance from end face E to the test position P4. Then, the controller 100 proceeds to step S7.

Also, in step S5, when no test position is determined to be inside the non-conformity region NR (step S5: NO), the controller 100 skips step S6 and proceeds to step S7.

Figure 5B:
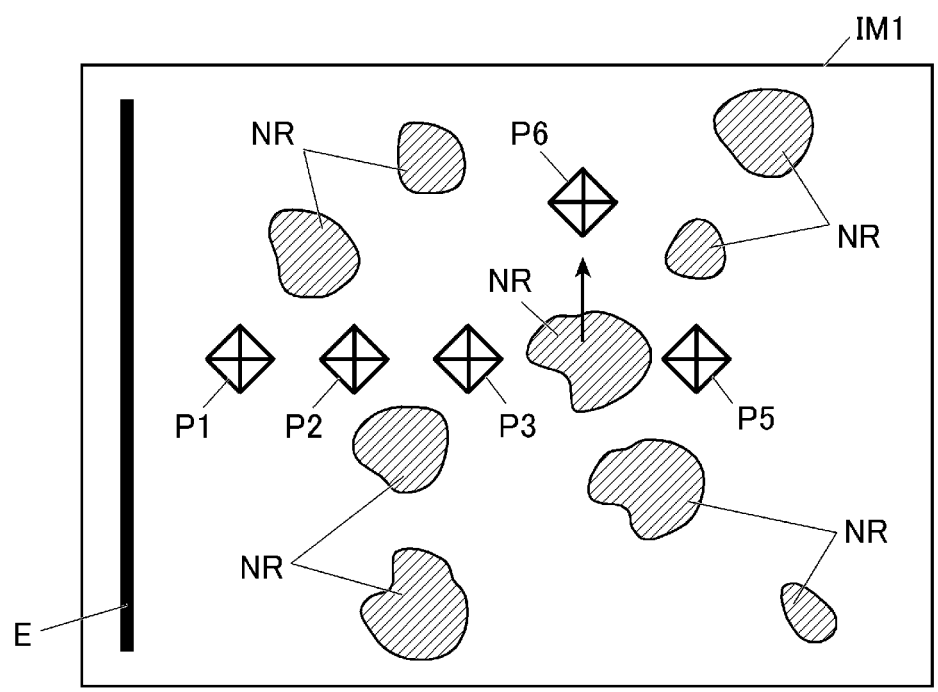
FIG. 5B illustrates a state where each corrected test position is superimposed on the surface image of the sample and displayed.

Next, the controller 100 controls the load arm 3, the motorized stage 92, and the like to form indentations in sequence at each test position defined in step S3 (or at a corrected test position for any test position determined to be inside the non-conformity region NR) (step S7). As shown in FIG. 5B, for example, when each test position (P1, P2, P3, P6, and P5) is defined, indentations are formed beginning at test position P1 and moving to test positions P2, P3, P6, and P5 in that order.

Next, the controller 100 obtains the surface image of the sample S following formation of the indentations, captured by the CCD camera 10a (step S8).

Next, the controller 100 calculates a hardness value of the sample S based on the surface image of the sample S obtained in step S8, after the indentations have been formed (step S9). Specifically, the controller 100 analyzes the surface image of the sample S, measures the length of a diagonal line of the indentation formed in the surface of the sample S, then calculates the hardness value of the sample S based on the measured length of the diagonal line. Then, the controller 100 ends the multipoint measurement.

As described above, the hardness tester 1 according to the present embodiment includes the image acquirer (controller 100) that acquires the image of the surface (surface image) of the sample S captured by the image capturer 10, the identifier (controller 100) that identifies, based on the surface image of the sample S, the non-conformity region NR inside the image that is not suitable for the hardness test using predetermined conditions, and the test position definer (controller 100) that defines the test position in the area other than the non-conformity region NR identified by the identifier. Therefore, according to the hardness tester 1 of the present embodiment, when defining the test position, it is possible to save the user from visually checking whether the position of the foreign matter overlaps with the test position, and therefore simplifies defining the test position.

Further, the hardness tester 1 according to the present embodiment includes the specifier (controller 100) that specifies one or a plurality of test positions in the sample S based on the surface image of the sample S acquired by the image acquirer, and the test image definer defines the test position specified by the specifier and when the test position is inside the non-conformity region NR, the test image definer corrects the test position to a position not inside the non-conformity region NR. Therefore, according to the hardness tester 1 of the present embodiment, when the initially defined test position is inside the non-conformity region NR, it is possible to save the user from redefining the test position to a position not inside the non-conformity region NR, and therefore simplifies defining the test position.

Further, according to the hardness tester 1 of the present embodiment, when the test pattern related to the arrangement of test positions is specified based on a user operation, a plurality of test positions are specified based on the test pattern, and of the various specified test positions, a test position that is inside the non-conformity region NR is corrected to a position that is not inside the non-conformity region NR. Therefore, when a test position is inside the non-conformity region NR when performing the multipoint measurement in the test pattern desired by the user, the multipoint measurement can be performed smoothly since the test position can be corrected appropriately.

Further, according to the hardness tester 1 of the present embodiment, when correcting the test position that is inside the non-conformity region NR to the position that is not inside the non-conformity region NR, the end face E of the sample S is used as a reference to correct the test position to a position that is a similar distance from the reference as the distance from the reference to the original test position, and therefore, the measurement can be performed at the next best position.

Further, the hardness tester 1 according to the present embodiment includes a binarization component (controller 100) that, based on a predetermined threshold value, binarizes the surface image of the sample S acquired by the image acquirer, and the identifier identifies an area that is equal to or less than the predetermined threshold value as the non-conformity region NR based on the image data binarized by the binarization component, which allows the non-conformity region NR to be identified readily.

Above, a concrete description is given based on the embodiment according to the present invention. However, the present invention is not limited to the above-described embodiment and may be modified within a scope not deviating from the substance of the invention.

For example, in the above-described embodiment, as shown in FIGS. 5A and 5B, of the test positions P1 to P5 defined by the controller 100, the test position P4 that is inside the non-conformity region NR is corrected to the position P6 which is not inside the non-conformity region NR. However, the present invention is not limited to this. For example, when the test position P4 of the test positions P1 to P5 is inside the non-conformity region NR as noted above, each of the test positions P1 to P5 may be corrected to a position that is not inside the non-conformity region NR and that can also maintain the test pattern initially specified.

In addition, in the above-described embodiment, using a point separated by a predetermined distance from the end face E of the sample S as a start point, five points for measurement (test positions) are defined at a predetermined pitch, beginning at the start point, in a direction orthogonal to the end face E based on the test pattern. Therefore, when correcting a test position that is inside the non-conformity region NR to a position not inside the non-conformity region NR, the end face E of the sample S is used as a reference to correct the test position to a position that is a similar distance from the reference as the distance from the reference to the original test position. However, for a shaft of a gear, when a plurality of test positions are defined based on a shaft center as a reference, and when the test position that is inside the non-conformity region NR is corrected to a position not inside the non-conformity region NR, using the shaft center of the gear as the reference, the position is corrected to a position that is a similar distance from the reference as the distance from the reference to the original test position. Further, for teeth of the gear, when defining a plurality of test positions using the shaft center as the reference, when correcting the test position that is inside the non-conformity region NR to a position not inside the non-conformity region NR, the position is corrected using the shaft center of the gear as the reference to a positions on the teeth that is a similar distance from the reference as the distance from the reference to the original test position. Further, for example, when defining a plurality of test positions using a welded portion (boundary) where two base materials are welded as a reference, when correcting the test position that is inside the non-conformity region NR to a position not inside the non-conformity region NR, the position is corrected, using the welded portion (boundary) as the reference, to a position that is a similar distance from the reference as the distance from the reference to the original test position.

In addition, in the above-described embodiment, the test positions P1 to P5 are tentatively defined based on the test pattern specified by the user operation, and the test position P4 that is inside the non-conformity region NR is auto-corrected to the test position P6. However, when defining the test position automatically without a user operation, for example, the test position may be defined from the very start in an area not inside the non-conformity region NR.

In addition, in the above-described embodiment, the non-conformity region NR is identified by performing binarization on the surface image of the sample S based on the predetermined threshold value. However, the present invention is not limited to the above identification method as long as the non-conformity region NR that contains a foreign matter such as graphite can be identified. For example, the non-conformity region NR may be identified by accumulating template images ahead of time that capture an area that contains foreign matter and performing a matching process with the surface image of the sample S to be measured and the template images.

Figure 6:
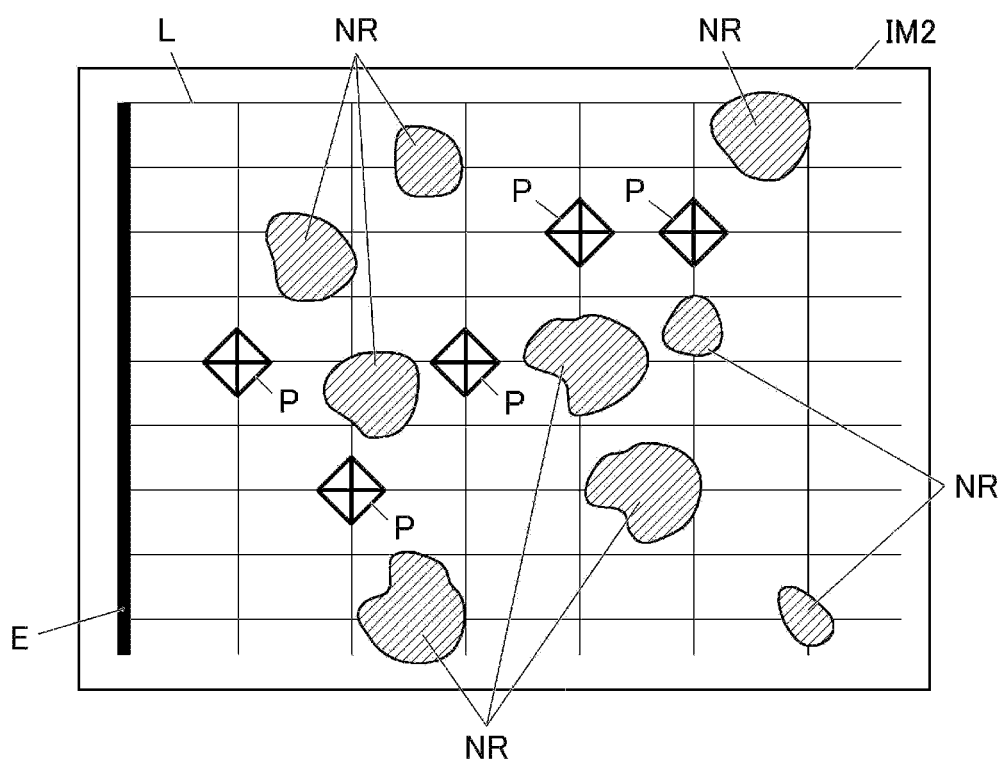
FIG. 6 illustrates a state where each test position is corrected in a manual correction mode.

In addition, in the above-described embodiment, when a test position is determined to be inside the non-conformity region NR in the multipoint measurement (see FIG. 4), the controller 100 auto-corrects the test position. However, the test position may be manually corrected by the user in such cases. Specifically, when a test position is determined to be inside the non-conformity region NR, the controller 100 sends notification via the display 16 that there is a test position inside the non-conformity region NR, for example. Thereafter, when an input is entered via the console 15 to instruct a transition to a manual correction mode to enable manual correction of the test position, as shown in FIG. 6, the controller 100 superimposes a grid L onto a surface image IM2 of the sample S and displays the image on the display 16. Then, by entering an input via the console 15 to specify an intersection on the grid L noted above, a test position P can be corrected to the specified intersection. Also, after the controller 100 auto-corrects the test position, the correction of the test position may be performed in the manual correction mode noted above. Further, when the sample S is a cylindrical work piece, for example, a concentric circle is superimposed instead of the grid L and displayed on the display 16. Then, by entering an input to specify an intersection between the concentric circle and a normal of a user's desired angle, via the console 15, the test position may be corrected to the specified intersection.

In addition, in the above-described embodiment, a Vickers hardness tester in which the planar shape of the indenter 5 is formed in a rectangular shape is described to exemplify the hardness tester 1. However, the present invention is not limited to this. In other words, any hardness tester may be used as long as hardness of the sample S is measured by loading a predetermined test force on the surface of the sample S with the indenter 5 to form an indentation in the surface of the sample S, then measuring dimensions of the indentation. For example, the hardness tester may be a Knoop hardness tester that includes a quadrangular pyramid diamond indenter and the planar shape of the indenter is formed in a rectangle shape similar to the Vickers hardness tester, or may be a Brinnell hardness tester in which the indenter is shaped like a sphere.

Further, all aspects described in the present application can also be understood as a method, a program, and the like. For the categories of method and program, the words "means" or "-er" used in the component category may be replaced appropriately with words such as "process" and "step," for example. In addition, the order of the processes and steps is not limited to those directly described in the present application, and it is possible to change the order or execute portions of a process all at one time or incrementally as needed.

In addition, within a scope not deviating from the substance of the present invention, appropriate modifications may also be made to detailed structures and operations of each component configuring the hardness tester.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A hardness tester that measures hardness of a sample by loading a predetermined test force on a surface of the sample with an indenter to form an indentation in the surface of the sample, and measuring dimensions of the indentation, the hardness tester comprising:
   a processor and a memory that stores a set of executable instructions, wherein upon execution of the executable instructions by the processor, the hardness tester operates as:
      an image acquirer that acquires an image of surface of the sample captured by an image capturer;
      an identifier that identifies, based on the image of the surface of the sample, a non-conformity region inside the image that is unsuitable for the hardness test, using predetermined conditions; and a test position definer that defines a test position in an area outside the non-conformity region identified by the identifier.

2. The hardness tester according to claim 1, wherein:

upon execution of the executable instructions by the processor, the hardness tester further operates as a specifier that specifies one or a plurality of test positions for the sample based on the image of the surface of the sample acquired by the image acquirer, and the test position definer further defines the test position specified by the specifier and, when the test position is inside the non-conformity region, corrects the test position to a position outside the non-conformity region.

3. The hardness tester according to claim 2, wherein:

the specifier, when a test pattern related to an arrangement of the test positions is specified based on a user operation, specifies the plurality of test positions based on the test pattern, and the test position definer corrects, of the various test positions specified by the specifier, a test position that is inside the non-conformity region to a position outside the non-conformity region.

4. The hardness tester according to claim 3, wherein the test position definer, when correcting the test position that is inside the non-conformity region to the position outside the non-conformity region, uses one of a predetermined point, line, or plane on the sample as a reference and corrects the test position to a position at substantially the same distance from the reference as the distance from the reference to the original test position.

5. The harness tester according to claim 4, wherein:

upon execution of the executable instructions by the processor, the hardness tester further operates as a binarization component that binarizes, based on a predetermined threshold value, the image of the surface of the sample acquired by the image acquirer, and the identifier identifies, based on image data binarized by the binarization component, an area that is less than or equal to the predetermined threshold value as the non-conformity region.

6. The harness tester according to claim 3, wherein:

upon execution of the executable instructions by the processor, the hardness tester further operates as a binarization component that binarizes, based on a predetermined threshold value, the image of the surface of the sample acquired by the image acquirer, and the identifier identifies, based on image data binarized by the binarization component, an area that is less than or equal to the predetermined threshold value as the non-conformity region.

7. The hardness tester according to claim 2, wherein the test position definer, when correcting the test position that is inside the non-conformity region to the position outside the non-conformity region, uses one of a predetermined point, line, or plane on the sample as a reference and corrects the test position to a position at substantially the same distance from the reference as the distance from the reference to the original test position.

8. The harness tester according to claim 7, wherein:

upon execution of the executable instructions by the processor, the hardness tester further operates as a binarization component that binarizes, based on a predetermined threshold value, the image of the surface of the sample acquired by the image acquirer, and the identifier identifies, based on image data binarized by the binarization component, an area that is less than or equal to the predetermined threshold value as the non-conformity region.

9. The hardness tester according to claim 2, wherein:

the specifier, when a test pattern related to an arrangement of the test positions is specified based on a user operation, specifies the plurality of test positions based on the test pattern, and the test position definer, when at least any one of the various test positions specified by the specifier is inside the non-conformity region, corrects each of the test positions to a position that is outside the non-conformity region and that can also maintain the test pattern.

10. The harness tester according to claim 9, wherein:

upon execution of the executable instructions by the processor, the hardness tester further operates as a binarization component that binarizes, based on a predetermined threshold value, the image of the surface of the sample acquired by the image acquirer, and the identifier identifies, based on image data binarized by the binarization component, an area that is less than or equal to the predetermined threshold value as the non-conformity region.

11. The harness tester according to claim 2, wherein:

upon execution of the executable instructions by the processor, the hardness tester further operates as a binarization component that binarizes, based on a predetermined threshold value, the image of the surface of the sample acquired by the image acquirer, and the identifier identifies, based on image data binarized by the binarization component, an area that is less than or equal to the predetermined threshold value as the non-conformity region.

12. The harness tester according to claim 1, wherein:

upon execution of the executable instructions by the processor, the hardness tester further operates as a binarization component that binarizes, based on a predetermined threshold value, the image of the surface of the sample acquired by the image acquirer, and the identifier identifies, based on image data binarized by the binarization component, an area that is less than or equal to the predetermined threshold value as the non-conformity region.

13. At least one tangible, non-transitory computer-readable medium storing an executable set of instructions for measuring hardness of a sample by loading a predetermined test force on a surface of the sample with an indenter to form an indentation in the surface of the sample and measuring dimensions of the indentation, wherein the set of instructions, when executed by a computer processor, causes the computer processor to execute operations comprising:

acquiring, via an image acquirer, an image of the surface of the sample captured by an image capturer;

identifying, via an identifier and based on the image of the surface of the sample, a non-conformity region inside the image that is unsuitable for the hardness test using predetermined conditions; and defining, via a test position definer, a test position in an area outside the non-conformity region identified by the identifier.

14. A method for measuring hardness of a sample by loading a predetermined test force on a surface of the sample with an indenter to form an indentation in the surface of the sample and measuring dimensions of the indentation, the method comprising:

acquiring, via an image acquirer, an image of the surface of the sample captured by an image capturer;

identifying, via an identifier and based on the image of the surface of the sample, a non-conformity region inside the image that is unsuitable for the hardness test using predetermined conditions; and defining, via a test position definer, a test position in an area outside the non-conformity region identified by the identifier.

* * * * *